United States Patent [19]

Duffy

[11] Patent Number: 4,921,264
[45] Date of Patent: May 1, 1990

[54] COLLAPSIBLE LIBRARY RANGE DOLLY

[76] Inventor: James C. Duffy, 9300 Dillion Dr., La Mesa, Calif. 92041

[21] Appl. No.: 309,735

[22] Filed: Feb. 13, 1989

[51] Int. Cl.⁵ .......................... B62B 3/02; B62B 11/00
[52] U.S. Cl. ............................ 280/79.11; 280/47.34;
        280/47.36; 280/47.131; 108/55.3; 414/458
[58] Field of Search ...................... 280/79.11, 79.3, 32,
        280/32.6, 47.23, 47.34, 47.131, 87.021, 47.36;
                        108/55.1, 55.3, 901; 414/458, 459

[56] References Cited

U.S. PATENT DOCUMENTS

| | | | |
|---|---|---|---|
| 2,392,409 | 1/1946 | Ray | 280/47.34 X |
| 2,774,609 | 12/1956 | Winger | 280/79.11 |
| 3,338,591 | 8/1967 | Rowland | 280/79.11 |
| 3,533,640 | 10/1970 | Fator | 280/79.11 X |
| 3,633,774 | 1/1972 | Lee | 280/79.11 X |
| 3,873,119 | 3/1975 | Koch | 280/79.11 X |
| 4,168,078 | 9/1979 | Haldimann | 280/79.11 X |
| 4,277,075 | 7/1981 | Shay | 280/79.11 X |
| 4,344,368 | 8/1982 | Remington et al. | 108/55.3 X |
| 4,512,591 | 4/1985 | Plante | 280/79.11 X |
| 4,572,531 | 2/1986 | Elia | 280/79.11 X |
| 4,641,845 | 2/1987 | Hewitt | 280/79.11 |

Primary Examiner—Charles A. Marmor
Assistant Examiner—Brian L. Johnson
Attorney, Agent, or Firm—Charles C. Logan, II

[57] ABSTRACT

A collapsible library range dolly is formed from a pair of side frame mebers, a pair of cross members, and a post. The side frame members each have a pair of swivel casters secured to their bottom surface and there are attachment plates secured to their opposite ends. The cross members each have an upright tubular member secured to their top surface adjacent their ends. Bolts that pass through the upright tubular members have their ends secured to the attachment plates of the side frame members. A vertically oriented post is detachably secured to one of the upright tubular members for pushing or pulling the dolly.

5 Claims, 2 Drawing Sheets

COLLAPSIBLE LIBRARY RANGE DOLLY

BACKGROUND OF THE INVENTION

The invention rlates to free-standing steel shelving such as used in libraries, and more specifically to collapsible library range dolly that can be used to move the free-standing steel shelving while the books are still stacked thereon.

Relocating free-standing steel shelving is an expensive, labor-intensive activity in any library. All of the books must be removed from the shelves and then the shelving is generally disassembled. The shelving must then be reassembled at a new location and the books returned to the shelves in the same order as before the move. This is a standard proceedure used by libraries when new carpeting must be installed or when a new floor layout or relocation of the shelving is desired.

A need exists for a device that will permit the movement of a range of library shelving with books left on the shelves. Devices and proceedures which may help somewhat to simplify this proceedure have been discussed in literature but none have entirely solved the problem due to requirements to unload all or part of the ranges, or where the prices where prohibitative. A device developed at Miami University uses rolling trailer jacks, and it is attached to the upright columns and permits movement of a range after all of the books have been removed from the shelves. A range moving deviĉe developed at Cumberland College, consists of a steel frame on wheels and having hoisting winches capable of lifting and moving fully loaded ranges over plywood tracks. Another proceedure involves sliding partially unloaded ranges over carpet. This is accomplished by tilting the ranges slightly and sliding a steel shelf under each upright, the shelf thereby acts as a runner. A more recent development at Morehead State University, consists of metal racks with large casters. Hydraulic jacks are used to lift each section from the top. This system is described as being capable of moving fully-loaded ranges with little or no preparation of the stacks.

It is an object of the invention to provide a novel library range dolly that is collapsible so that its cross members may be slid under the lower cross beams of a section of free-standing steel shelving prior to its assembly.

It is also an object of the invention to provide a novel collapsible library range dolly that is easily assembled and disassembled in a minimum amount of time.

It is another object of the invention to provide a novel collapsible library range dolly that is economical to manufacture and market.

It is an additional object of the invention to provide a novel library range dolly that is collapsible for storage and in which state it occupies a minimum amount of storage space.

SUMMARY OF THE INVENTION

Applicant's novel collapsible library range dolly permits the movement of a range of free-standing steel shelving while the books remain on the shelves. Each dolly supports the weight of one double faced section plus half the weight of each adjacent double faced section of seven shelves loaded with books. As an example, one set of four of applicant's dollies will support a range of seven double faced sections, with one dolly under every other section.

Each range dolly consists of five components. Two identical cross members fit under the shelving adjacent to each upright column and two other identical side frame members, with two swivel casters each, fit outside the shelving on opposite sides. These four members are attached to each other using two bolts at each of the four corners. Each dolly has a post extending up chest high so an individual can grasp it either to push or pull the dolly in the desired direction. Since each caster swivels, the range can be moved in any direction.

The weight of the books and shelving is transferred down the upright columns to the midpoint of the base support members which rest on two angles that are attached to each of the range dolly cross members. The weight of the books, shelving and dollies is supported by casters, each of which is capable of supporting 700 pounds.

The free-standing section of shelving must be raised approximately ½ inch to permit placing the cross members under it. This is accomplished by using a pry bar and placing ½ inch wooden shims under the levelors on both sides of the range. The side members are then attached to the cross members. The free standing section is again raised slightly with a pry bar, and with the weight transferred to the dolly, the shims are removed and the levelors adjusted upwardly to clear the floor surface.

After each dolly is assembled in this manner, the loaded range (shelving and books) can be moved easily by having a person at each dolly pull or push the post to move the range to its desired location. Once in the new location, the above proceedure is reversed and the dolly is disassembled and removed from under the range. A crew of four who have performed the operation several times can install four dollies and move a loaded seven section range of steel shelving in fifteen minutes. Carpets present no problem for the range dolly, other than the fact it is a little more difficult to overcome inertia. Most carpeting used in libraries is of a commercial grade with a tight weave and low nap. The range dolly casters are designed to support and move heavy office equipment on carpeting or hard surfaces.

A standard set of range dollies disassembles into easily stored components and require minimal tools for assembly. Because the design of applicant's dolly is quite simple, requiring no winches or jacking devices, the range dolly can be manufactured and purchased at relatively modest cost. It should pay for itself the first time a new shelving arrangement or carpeting is required. A major advantage of the range dolly is that the weight of the shelving and the books is borne in exactly the same manner in which the shelving was originally manufactured, from the feet to the uprights. No unusual stress is applied to any portion of a range during the assembly of the range dolly or during the movement of a range.

DESCRIPTION OF THE PREFERRED EMBODIMENT

Figure 1:
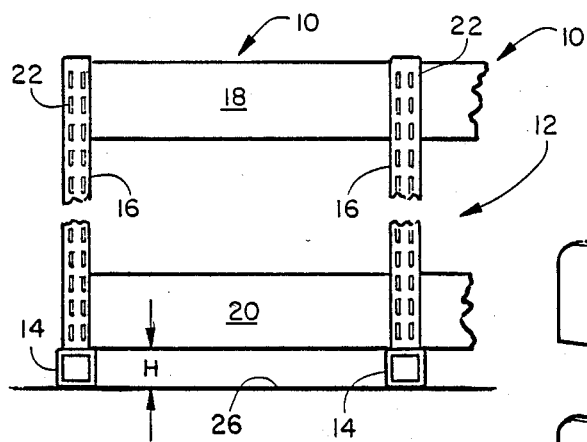
FIG. 1 is a side elevation view of a library range with the shelf brackets and shelves removed.

Applicant's novel library range dolly will now be described by referring to FIGS. 1-7 of the drawings. In FIG. 1 the environment in which the library range dolly is used is illustrated. A plurality of sections 10 of free-standing steel shelving is connected to each other to form a range 12. Each section 10 has a pair of horizontal support base members 14 with a column 16 attached to their respective top surface. An upper cross beam 18 and a lower cross beam 20 have their opposite ends secured to the respective columns 16. On the lateral surfaces of column 16 a double row of slots 22 are formed and they detachably receive the brackets 24 that support the shelves 25. The bottom surface of lower cross beam 20 is spaced a distance H above the floor surface 26.

Figure 5:
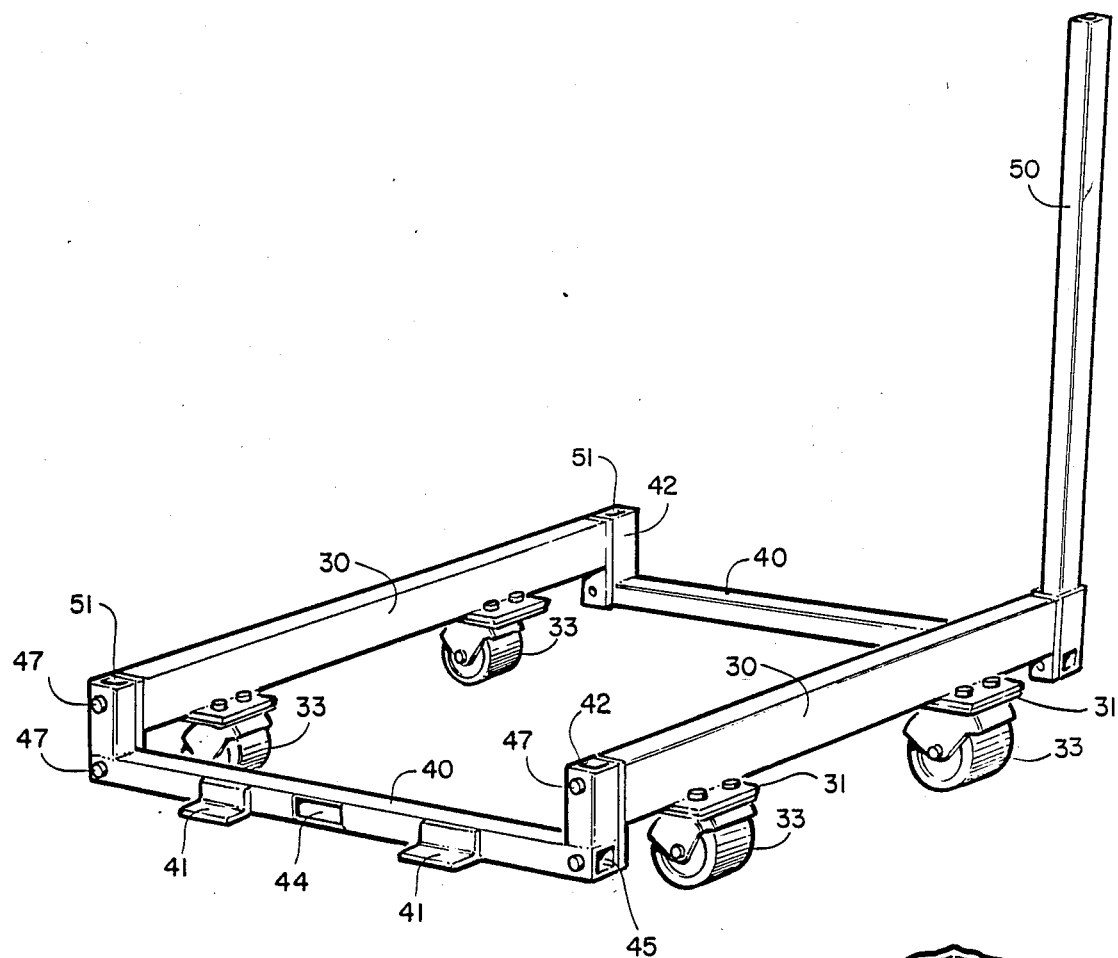
FIG. 5 is a front perspective view of applicant's novel library range dolly.
Figure 6:
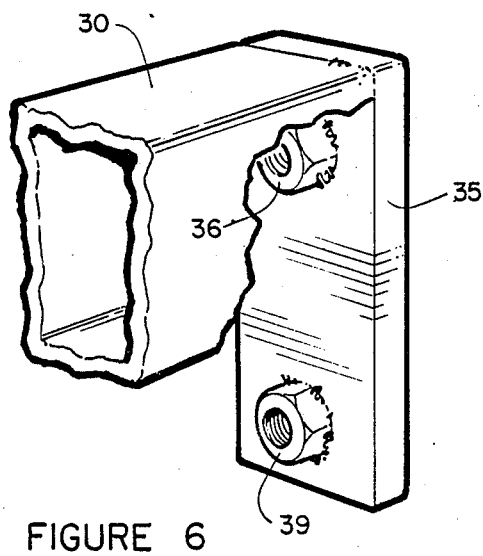
FIG. 6 is a partial front elevation view illustrating one end of the side frame member with portions broken away.
Figure 7:
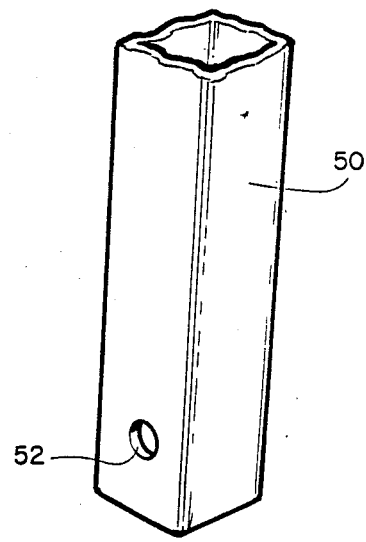
FIG. 7 is a front elevation view of the bottom portion of the post member.

In FIG. 5, one of the library range dollies 28 that is used to move the range of free-standing steel shelving is illustrated. It has a pair of laterally spaced side frame members 30 made of rectangular tubular steel. A pair of plates 31 are welded to the bottom surface of side frame member 30 and swivel castors 33 are secured to their bottom surface. The opposite ends of framed side frame members 30 have a plate 35 welded thereto (see FIG. 6). It has a nut 36 welded adjacent its top end and a nut 39 welded adjacent its bottom end. A pair of cross members 40 are made of square tubular steel and upright tubular members 42 are welded to the top surface of cross member 40 adjacent its opposite ends. Angles 41 are welded to the outer wall surface of cross members 40. The outer wall surfaces also have a cutout portion 44. Each end of cross member 40 has a pry bar aperture 45. Apertures are formed adjacent the top end of upright tubular members 42 to receive bolts 47 and they align with apertures that are also formed adjacent the respective ends of cross member 40 for receiving bolts 47. A post 50 having aligned apertures 52 adjacent its bottom end may be detachably received in the apertures 51 formed in the top end of upright tubular members 42. Angles 41 slip under the horizontal support base members 14 so that they may be lifted upwardly and supported thereon. The cutouts 44 allow the enlarged central member of horizontal support base member 14 to nest in surface contact with the cross members 40. Post 50 is used to pull or push the dolly both when loaded and unloaded.

Figure 2:
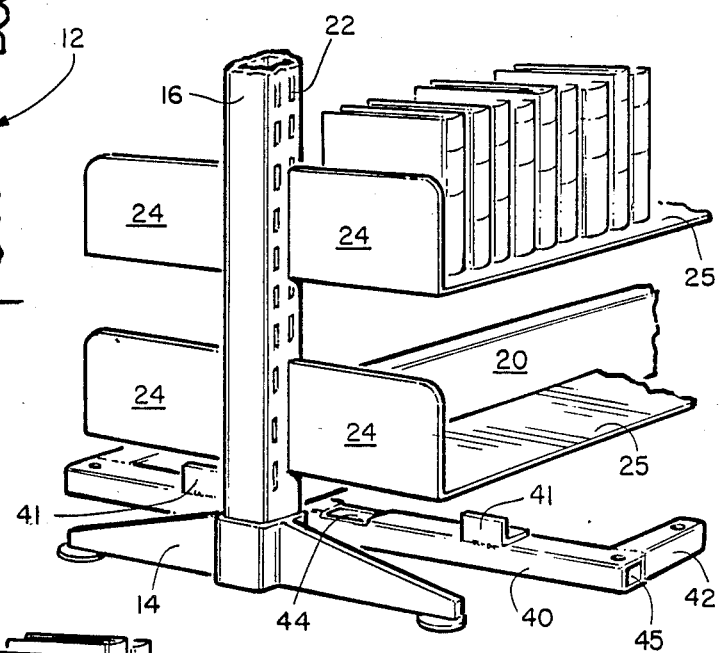
FIG. 2 is a partial front perspective view of a section of library shelves showing one of the cross members initially inserted there beneath.
Figure 3:
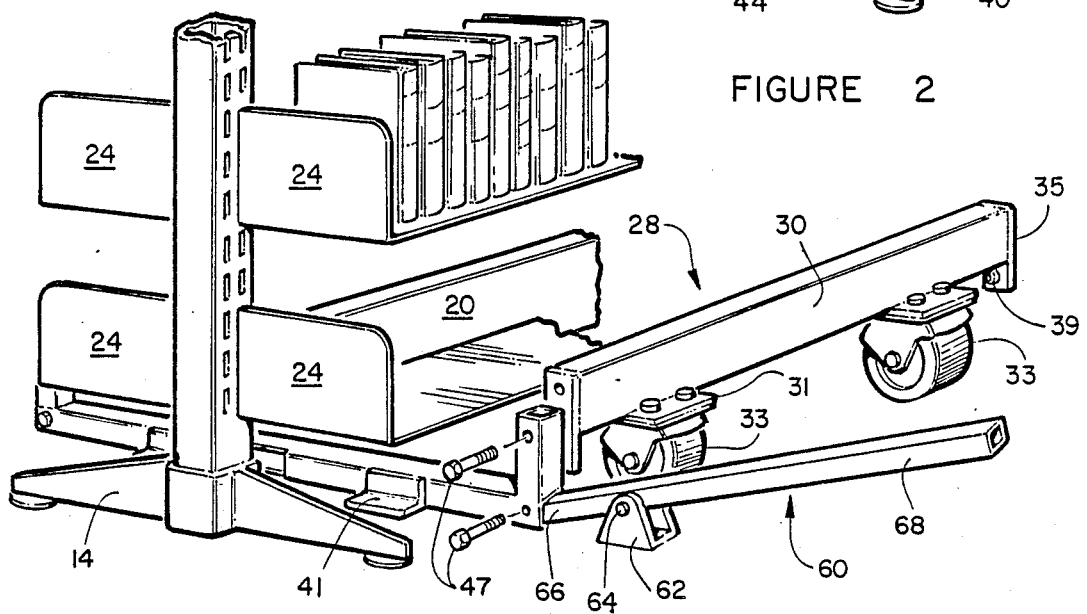
FIG. 3 is a partial front perspective view illustrating the manner in which the side frame members are connected to the cross members.
Figure 4:
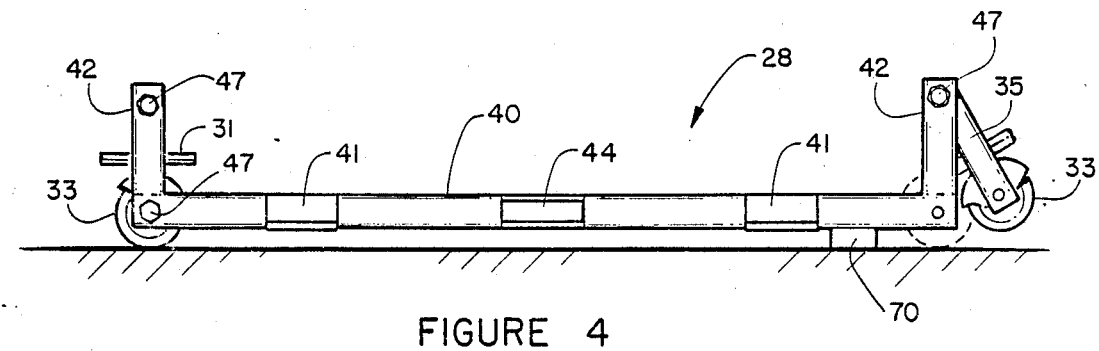
FIG. 4 is a front elevation view of the library range dolly showing the manner in which the side frame members are connected to the cross frame members.

The purpose of FIGS. 2-4 is to give a better understanding of the manner in which the library range dolly 28 is assembled beneath the sections 10 of the range 12.

A pry bar 60 is illustrated in FIG. 3 that is used to lift one end of the cross members 40 so that side frame members 30 can be attached. A fulcrum assembly 62 has a pin 64 that passes through aligned apertures in bar 60. The front end 66 of the pry bar is inserted into aperture 45 in order to life one end of cross members 40 until side frame members 30 can be oriented correctly. The rear end 68 of the pry bar is pressed dowwnwardly and the blocks 70 are removed. The height of cross members 40 is slightly less than the height H.

What is claimed is:

1. A collapsible library range dolly comprising:
a pair of laterally spaced elongated side frame members having a predetermined length, said side frame members having a front end, a rear end and a bottom surface, said side frame members being made of tubular steel;
at least four swivel casters;
means for securing at least two of said swivel casters to the bottom surface of each of said side frame members;
a pair of cross members made of square tubular steel each of which has a top surface, an outer wall surface, a left end and a right end, four square tubular steel upright members each of which has a bottom end, said upright members being welded to the top surface of said cross members adjacent their respective ends; and
means for detachably securing the respective ends of said side frame members to the ends of said respective cross members so that said side frame members lay in a horizontal plane spaced a predetermined height above the horizontal plane in which said cross members lay comprising four vertically oriented attachment plates each having a top end, a bottom end, a front surface and a rear surface, said attachment plates having their rear surfaces adjacent their top ends welded to the respective ends of said side frame members, a nut is also welded to the rear surface of each of said attachment plates adjacent their top and bottom ends, these nuts align with apertures in said attachment plates, said upright members and the ends of said cross members have apertures that align with the respective apertures in said attachment plate and bolts are threadably received in said apertures for detachably securing said cross members to said side frame members through said attachment plates.

2. A collapsible library range dolly as recited in claim 1 further comprising an elongated post for pushing said dolly, said post having a bottom end that detachably mates with any of said four upright members.

3. A collapsible library range dolly as recited in claim 1 wherein each of the respective ends of said square tubular steel cross members have a pry bar aperture therein.

4. A collapsible library range dolly as recited in claim 1 further comprising a pair of longitudinally spaced angles secured to the outer wall surface of each of said cross members.

5. A collapsible library range dolly as recited in claim 4 further comprising a cutout portion in the outer wall surface of each of said cross members for matingly receiving a lateral protrusion on a horizontal base member of a library shelving section.

* * * * *